INVENTOR.
KENNETH R. KAPLAN
BY
Attorney

INVENTOR.
KENNETH R. KAPLAN
BY
Samuel Cohen
Attorney

INVENTOR.
KENNETH R. KAPLAN
BY
[signature]
Attorney

United States Patent Office 3,456,126

Patented July 15, 1969

3,456,126

THRESHOLD GATE LOGIC AND STORAGE CIRCUITS

Kenneth R. Kaplan, East Brunswick, N.J., assignor to RCA Corporation, a corporation of Delaware Filed July 29, 1966, Ser. No. 568,895

Int. Cl. H03k *19/42*

U.S. Cl. 307—211 17 Claims

ABSTRACT OF THE DISCLOSURE

A family of threshold gate circuits which have the feature that they can perform a plurality of functions during a single cycle, as for example, gating in and storing one signal while reading out a second signal. These circuits all include a pair of threshold gates so interconnected that for one value of a control signal applied to both gates, the first gate's effect on the second gate is cancelled and for another value of the control signal, the output of the second gate is a function of that of the first gate.

This invention relates to threshold gates and more particularly to circuits employing such gates as logic and storage elements.

The circuits of the present invention all include a pair of similarly interconnected threshold gates. An information signal is applied to at least the first gate of this pair of gates. A control signal is applied in parallel to both gates. A bias is applied to at least the first gate. The value of the bias signal is such that a control signal of one value causes the first gate to produce an output of predetermined value regardless of the value of the information signal and causes the second gate to produce an output also which does not depend upon the value of the information signal. However, a control signal of the other binary value causes the information signal to be gated into the second threshold gate.

An important feature of all circuits of the invention is that the information signal may be handled in one cycle of the circuit operation, that is, upon the application of the control signal, the information signal, which may already be present, is immediately processed.

The invention is discussed in greater detail below and is shown in the following drawings of which:

The blocks making up the figures represent circuits which receive electrical signals indicative of binary digits (bits) and which produce outputs indicative of bits. For the sake of brevity, it is sometimes stated in the explanation which follows that a 1 or a 0 is supplied to or obtained from a stage rather than saying that a signal representing a 1 or 0 is supplied to or obtained from a stage.

A circuit element employed throughout the figures is a majority/minority gate. A majority gate is defined as a threshold gate with an odd number $n$ of input "weights," a threshold of $n+1/2$, and which produces an output indicative of the value of the majority of the input signal weights. A minority gate is a threshold gate with an odd number $n$ of input weights, a threshold of $n+1/2$, and which produces an output indicative of the value of the minority of the input signal weights. A majority/minority gate produces two outputs, one indicative of the majority function and the other complementary thereto and indicative of the minority function.

Figure 1:
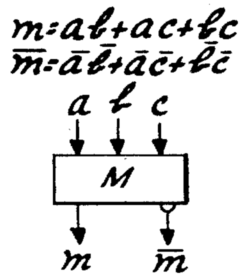
FIGURE 1 is a drawing of the gate element employed in the remaining figures.

FIGURE 1 illustrates a majority-minority gate having three inputs, each with weight 1. The Boolean equations defining the majority and minority functions are also given in the figure.

The majority/minority gate of FIGURE 1 may be implented in many different was. Examples of such implementations are cited in copending application Ser. No. 490,052 filed Sept. 24, 1965, now U.S. Patent No. 3,403,-267, by Robert O. Winder and assigned to the same assignee as the present application.

For the sake of uniformity, the circuit element of FIGURE 1 is employed throughout the remaining figures. However, in some cases only the minority output of a gate is needed and there a minority gate may be substituted for the majority/minority gate and in other cases only the majority output is needed so that a majority gate may be substituted for the majority/minority gate.

Figure 2:
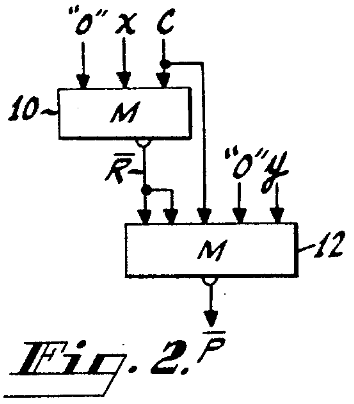
FIGURE 2 is a block diagram of a circuit which is common to all circuits of the invention.

A circuit of the present invention which is common to all of the more complex circuits which follow is shown in FIGURE 2. It consists of two gates 10 and 12 interconnected as shown. The first gate 10 receives a fixed bias 0, an information signal $x$ and a control signal C. The second gate 12 receives the minority output signal $\overline{R}$ of gate 10, the control signal C, a bias signal 0, and another information signal $y$.

The signal $\overline{R}$ applied to second gate 12 has twice the effect on gate 12 as any other signal applied to gate 12. This signal, in other words, has an effective weight which is double that of a signal such as $y$. This double weighting may be achieved by applying $\overline{R}$ to two of the five input terminals to gate 12, as shown. Alternatively, $\overline{R}$ may be applied to a single input terminal of a four terminal gate 12 where that single terminal, in the case of a transistor gate, has in series therewith, a resistor which is effectively one-half the value of the resistors in series with the remaining three input terminals.

In the operation of the circuit of FIGURE 2, when C has the value 0, then $\overline{R}$ has the value 1 regardless of the value of $x$. This is so because two of the three inputs to gate 10 are 0 and the minority output therefore must be equal to 1. At gate 12, the effect of the $\overline{R}$ signal cancels the combined effect of the 0 bias signal and the C=0 signal. The output of gate 12 therefore is determined only by the value of the $y$ input signal. In formal terms, $\overline{P}=\overline{y}$ or $P=y$.

When C is equal to 1, then $\overline{R}=\overline{x}$. For example, if $x=1$, then two of the three inputs to gate 10 are 1 and $\overline{R}=0$. If $x=0$, then two of the three inputs to gate 10 are 0 and $\overline{R}=1$. The inputs to the second gate 12 are $\overline{R}$, 1, 0 and $y$. The 1 and 0 outputs cancel so that gate 12 operates as a three input gate and two of these three inputs are $\overline{R}$. Accordingly, $\overline{P}=R$ and since $R=x$, $\overline{P}=x$. In other words, when C changes to 1, the information bit $x$ is gated into stage 12 regardless of the value of $y$.

An important feature of the circuit of FIGURE 2 is that it operates in one cycle. As soon as C changes to 1, the $x$ information, if present, is gated into the circuit. On the other hand, the presence of the $x$ information when C is 0 has no effect whatsoever on the operation of the circuit.

Figure 3:
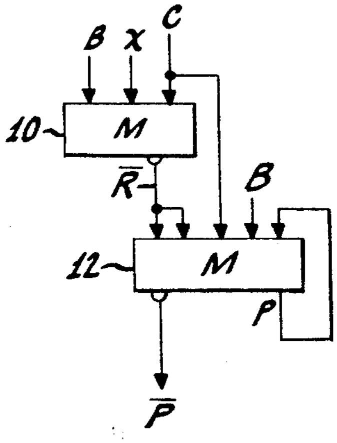
FIGURE 3 is a block diagram of a storage circuit according to the invention.

The circuit of FIGURE 3 is based on the circuit of FIGURE 2 but it has the added feature of a feedback connection from the P output terminal of gate 12 to the $y$ input terminal to gate 12. B in the circuit of FIGURE 3 is the bias signal and, as is explained shortly, it may have the fixed value 0 or 1.

In the operation of the circuit of FIGURE 3, assume first that $B=0$ and $C=0$. In this case, the value of $x$ does not affect the circuit operation, just as in the case of FIGURE 2. Also the $\overline{R}=1$ input to gate 12 cancels the $C=0$ and $B=0$ inputs to gate 12. Therefore, the $\overline{P}$ output of gate 12 is equal to the complement of the fifth input (which is P) to the gate, that is, $\overline{P}=\overline{P}$. In other words, gate 12 acts as a storage element and when both B and C are 0, it continues to store whatever information was previously gated into gate 12.

If B is 0 and C changes to 1, then the $x$ information is gated into the circuit of FIGURE 3. Under these conditions $\overline{R}=\overline{x}$ and $\overline{P}=R=x$.

Assume now that the bias $B=1$ and control signal $C=1$. In this case, $\overline{R}=0$ and $\overline{P}=\overline{P}$. In other words, gate 12 continues to store the information previously gated into gate 12. If B is 1 and C is 0, then $\overline{R}=\overline{x}$ and $\overline{P}=R=x$. In other words, the input information signal is gated into gate 12 and stored there when C returns to 1.

Figure 4:
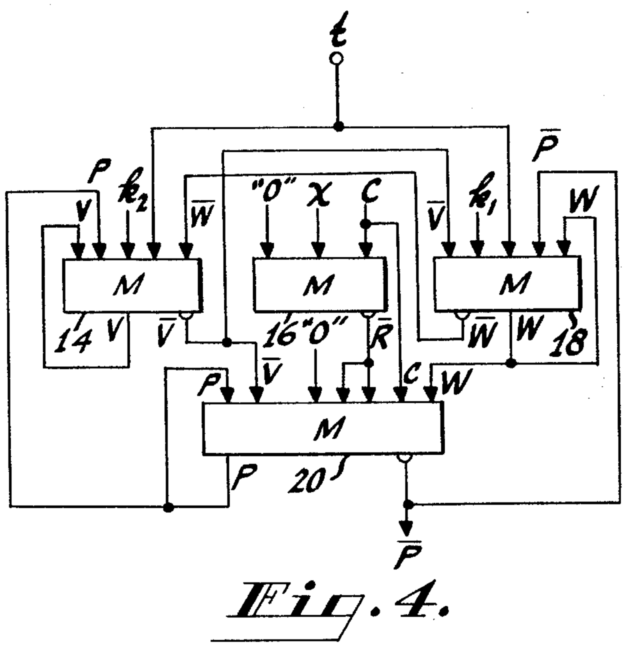
FIGURE 4 is a block circuit diagram of a triggerable flip-flop stage according to the invention.

The circuit of FIGURE 4 includes gates 14, 16, 18 and 20 interconnected as shown. The gates 14, 20 and 18 are analogous to the three gates shown in FIGURE 2 of the copending application above. The gates 16 and 20 are analogous to the gates of FIGURE 2 of the present application. When $C=0$ then $\overline{R}=1$ and the $\overline{R}=1$ input to gate 20 cancels the combined effect of the bias=0 and C=0 inputs to the same gate. Gate 20 therefore operates in the same manner as a three input majority/minority gate would, just as in the gate 14 of FIGURE 2 of the copending application. Under this set of conditions, the circuit of FIGURE 4 operates in exactly the same way as the circuit of FIGURE 2 of the copending application, as depicted in Table I thereof.

As explained in the copending application, the circuit of its FIGURE 2 is useful as a binary counter stage or a triggerable flip-flop stage. The modified circuit shown in FIGURE 4 of the present application permits input information to be gated into the circuit. The may be done by making C equal to 1. $\overline{R}$, in this case, is equal to $\overline{x}$ and since $C=1$ and the bias=0, at least three of the seven inputs to gate 20 have the value of $\overline{R}=\overline{x}$. In addition, of the remaining three inputs P, $\overline{V}$ and W, at least one of these inputs will be of the same value as $\overline{R}$. (Table I in the copending application shows that there is no stable circuit state in which $P=\overline{V}=W$.). Accordingly, at least four of the seven inputs have the value $\overline{R}$ so that $\overline{P}=R=x$. In other words, when C becomes 1 the bit $x$ is gated into gate 20 and remains stored there when C becomes 0.

The operation above is depicted in Table I below. Column 1 of the table represents the assumed initial condition of the circuit. In this condition $k_1=k_2=0$; $V=W=P=0$. Column 2 represents the circuit condition when $C=1$ and the input information bit $x=1$. Note that $\overline{P}$ is 1. Column 3 represents the circuit condition when $C=1$ and the input information bit $x=0$. Note that in this case $\overline{P}$ is equal to 0.

TABLE I

| | 1 | 2 | 3 |
|---|---|---|---|
| $t$ | 0 | 0 | 0 |
| Gate 14: | | | |
| V | 0 | 0 | 0 |
| P | 0 | 0 | 1 |
| $k_2$ | 0 | 0 | 0 |
| $\overline{W}$ | 1 | 1 | 1 |
| Gate 16: | | | |
| x | ∅ | 1 | 0 |
| C | 0 | 1 | 1 |
| Gate 18: | | | |
| $\overline{V}$ | 1 | 1 | 1 |
| $k_1$ | 0 | 0 | 0 |
| P | 1 | 1 | 0 |
| W | 0 | 0 | 0 |
| Gate 20: | | | |
| P | 0 | 0 | 1 |
| $\overline{V}$ | 1 | 1 | 1 |
| Bias | 0 | 0 | 0 |
| $\overline{R}$ | 1 | 0 | 1 |
| C | 0 | 1 | 1 |
| W | 0 | 0 | 0 |
| Output $\overline{P}$ | 1 | 1 | 0 |

∅=Don't care.

After the input bit is stored in stage 20, C is changed back to 0 and the trigger pulses $t$ may be applied. Thereafter, the circuit operates in exactly the same manner as the circuit of FIGURE 2 of the copending application.

Figure 5:
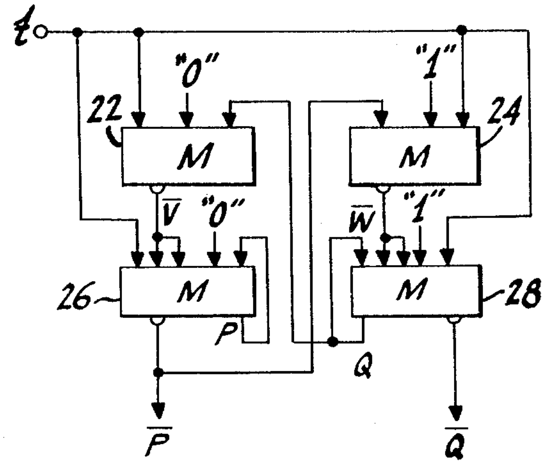
FIGURE 5 is a block circuit diagram of another form of triggerable flip-flop stage according to the invention.

The circuit of FIGURE 5 is a triggerable flip-flop. It includes four gates 22, 24, 26 and 28. The minority output of gate 26 is fed back as an input to gate 24 and the majority output of gate 28 is fed back as an input to gate 22. In addition, the majority output of gate 26 serves as an input to gate 26 and the majority output of gate 28 serves as an input to gate 28.

In the operation of the circuit of FIGURE 5, when $t=0$, $\overline{V}=1$ and four of the five inputs to majority gate 26 cancel. Accordingly, this gate continues to store the bit which it was originally storing. Two of the three input bits to gate 24 cancel and $\overline{W}$, the output of gate 24, is equal to P (the complement of the third input to gate 24). Q, the output of gate 28, is equal to $\overline{W}$ and this in turn is equal to P so that $\overline{Q}=\overline{P}$. In other words, the minority output of gate 26 is equal to the minority output of gate 28.

When $t=1$ then $\overline{W}=0$; $Q=Q$ (gate 28 stores the bit previously present in this gate); $\overline{V}=\overline{Q}$; and $P=\overline{V}=\overline{Q}$ so that $\overline{P}=Q$. In other words, the minority outputs of gates 26 and 28 are unequal, i.e., the circuit has been triggered into a new state and remains there when $t$ is returned to 0.

The cycling of the circuit of FIGURE 5 is shown in Table II below. The initial circuit condition assumed is $P=1$ and $t=0$.

TABLE II

| | | | | | | | |
|---|---|---|---|---|---|---|---|
| P | 1 | 0 | 0 | 1 | 1 | 0 | 0 |
| t | 0 | 1 | 0 | 1 | 0 | 1 | 0 |
| $\overline{V}$ | 1 | 0 | 1 | 1 | 1 | 0 | 1 |
| $\overline{W}$ | 1 | 0 | 0 | 0 | 1 | 0 | 0 |
| Q | 1 | 1 | 0 | 0 | 1 | 1 | 0 |

Figure 6:
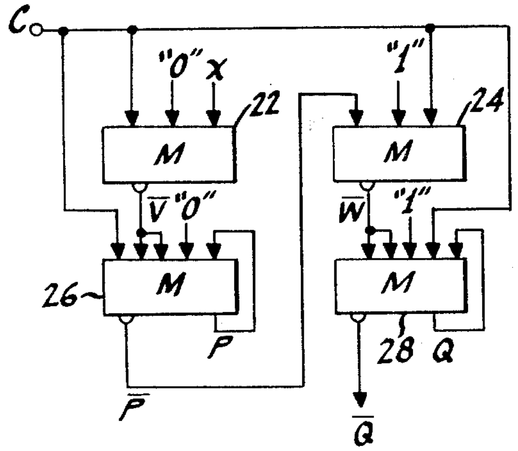
FIGURE 6 is a diagram of a circuit which, during one cycle, stores one bit of information and receives another bit of information and during the next cycle, stores the last-named bit and receives a third bit.

The circuit of FIGURE 6 is the same circuit as the one of FIGURE 5, however, the "feedback loop" is not closed. In other words, the Q output of gate 28 is fed back only to itself and not to stage 22. The third input to stage 22 is an information bit $x$.

In the operation of the circuit of FIGURE 6, when $C=1$, $\overline{V}=\overline{x}$; $P=\overline{V}=\overline{x}$ so that $\overline{P}=x$. In other words, the input bit $x$ is gated into stage 26 and stored there. Continuing, as two of the three inputs to gate 24 are 1, $\overline{W}=0$ and stage 28 stores the previous bit present in this stage.

When C changes from 1 to 0, $\overline{V}=1$ and stage 26 stores the bit $\overline{P}=x$ received during the previous half cycle of C. the output of gate 24$\overline{\mathrm{W}}$ is equal to P and $\overline{Q}=\overline{P}=x$. In other words, the information stored in gate 26 during the previous half cycle of C is now gated into and stored in gate 28.

Summarizing the operation of the circuit of FIGURE 6, during one-half cycle, input information $x$ is stored in gate 26. During the next one-half cycle, information previously in gate 28 is removed and the information bit $x$ stored in gate 26 is shifted into gate 28. During the next one-half cycle, gate 22 may receive a new bit $x$ while gate 28 stores the old bit $x$.

The circuit of FIGURE 6 is useful, for example, as an accumulator. While a new bit $x$ is accepted from a logic source such as an adder, the circuit provides a previously stored bit Q, which may be an addend bit, and all this occurs in one phase of the operation of the circuit. While only a single stage consisting of four gates is shown in FIGURE 6, it is to be appreciated that a plurality of such stages for storing a plurality of bits in parallel may be employed as a storage and gating sub-system of a data processing system.

Figure 7:
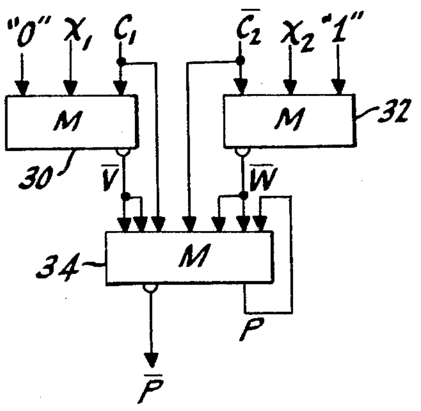
FIGURE 7 is a block diagram of a circuit for receiving and storing two different bits.

The circuit of FIGURE 7 is one which is capable of receiving a plurality of bits. The circuit comprises three gates 30, 32 and 34. The control signal $C_1$ is applied to gates 30 and 34 and the control signal $\overline{C}_2$ is applied to gates 32 and 34. Gates 30 and 32 receive fixed biases of 0 and 1, respectively, and also input information bits $x_1$ and $x_2$, respectively. The minority outputs of gates 30 and 32 are each applied with weight 2 to gate 34. The majority output of gate 34 is fed back as an input to the same gate.

In the operation of the circuit of FIGURE 7, when $C_1=C_2=0$ ($\overline{C}_2=1$) then $\overline{V}=1$; $\overline{W}=0$ and gate 34 continues to store the bit previously present in the gate. When $C_1=1$ and $C_2=0$ ($\overline{C}_2=1$) then $\overline{V}=\bar{x}_1$; $\overline{W}=0$ (therefore, $\overline{\mathrm{W}}$ cancels $C_1$ and $\overline{C}_2$); and $\overline{P}=V=x_1$. In other words, under this set of conditions, the bit $x_1$ is gated into the circuit and stored in gate 34. When $C_1=0$ and $C_2=1$ ($\overline{C}_2=0$) then $\overline{V}=1$ (therefore, V cancels $C_1$ and $\overline{C}_2$); $\overline{W}=\bar{x}_2$; and $\overline{P}=W=x_2$. In other words, under this set of conditions, the bit $x_2$ is gated into the circuit of FIGURE 7 and stored in gate 34.

Figures 8, 9:
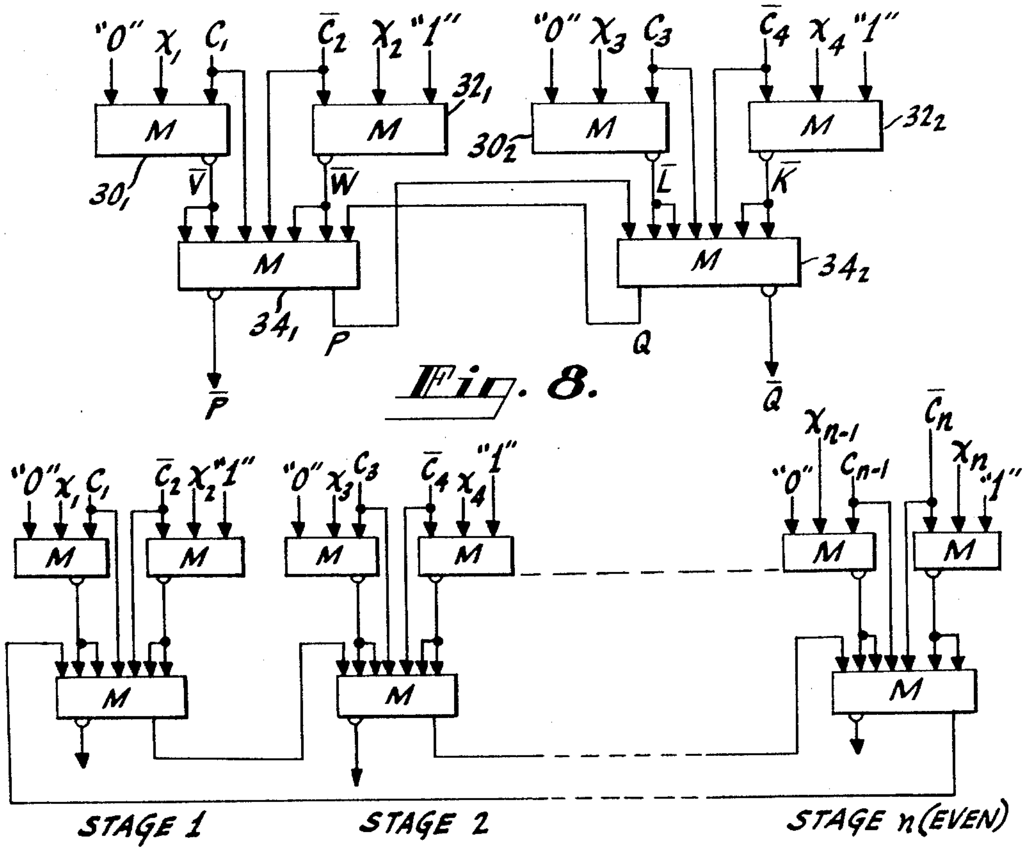
FIGURES 8 and 9 are expanded forms of the circuit of FIGURE 7.

A plurality of stages such as shown in FIGURE 7 may be interconnected for handling more than two input bits. One such circuit, this one for processing four bits, is shown in FIGURE 8. The majority output P of the lower gate, rather than being fed back as an input to the same gate, is instead applied to the "following gate." In case of gate $34_1$, the output is applied to gate $34_2$. In the case of the last gate in a chain such as $34_2$, the output is fed back as an input to the first gate $34_1$, in the chain.

The circuit of FIGURE 8 is a capable of selecting one bit and storing it from among the four inputs $x_1$–$x_4$. To select a bit such as $x_1$, $C_1$ is made to have the value 1 and $C_2$, $C_3$ and $C_4$ to have the value 0. Under this set of conditions $\overline{P}=x_1$, $P=\bar{x}_1$ and $\overline{Q}=x_1$. Note that six of the seven inputs to gate $34_2$ cancel when $C_3=C_4=0$ and the output Q of gate $34_2$ is equal to $\overline{\mathrm{P}}$. When $C_1$ is changed back to 0 so that $C_1=C_2=C_3=C_4$, $Q=P$ is fed back to $34_1$ so that $34_1$ continues to produce an output $\overline{P}=\overline{P}$. Any other input bit of the circuit of FIGURE 8 can be stored by making the corresponding control bit C equal to 1 and all other control bits equal to 0. For example, to store $x_2$, $C_2$ is made equal to 1 and $C_1$, $C_3$ and $C_4$ are made equal to 0.

FIGURE 9 shows a circuit analogous to the circuit of FIGURE 8 for selecting and storing one bit from among $n$ bits where $n$ is an even number of bits. If the number of input bits is odd, the last stage must be modified in the manner shown in FIGURE 10. In other respects, the circuit is similar to the one of FIGURE 9.

Figures 10, 11:
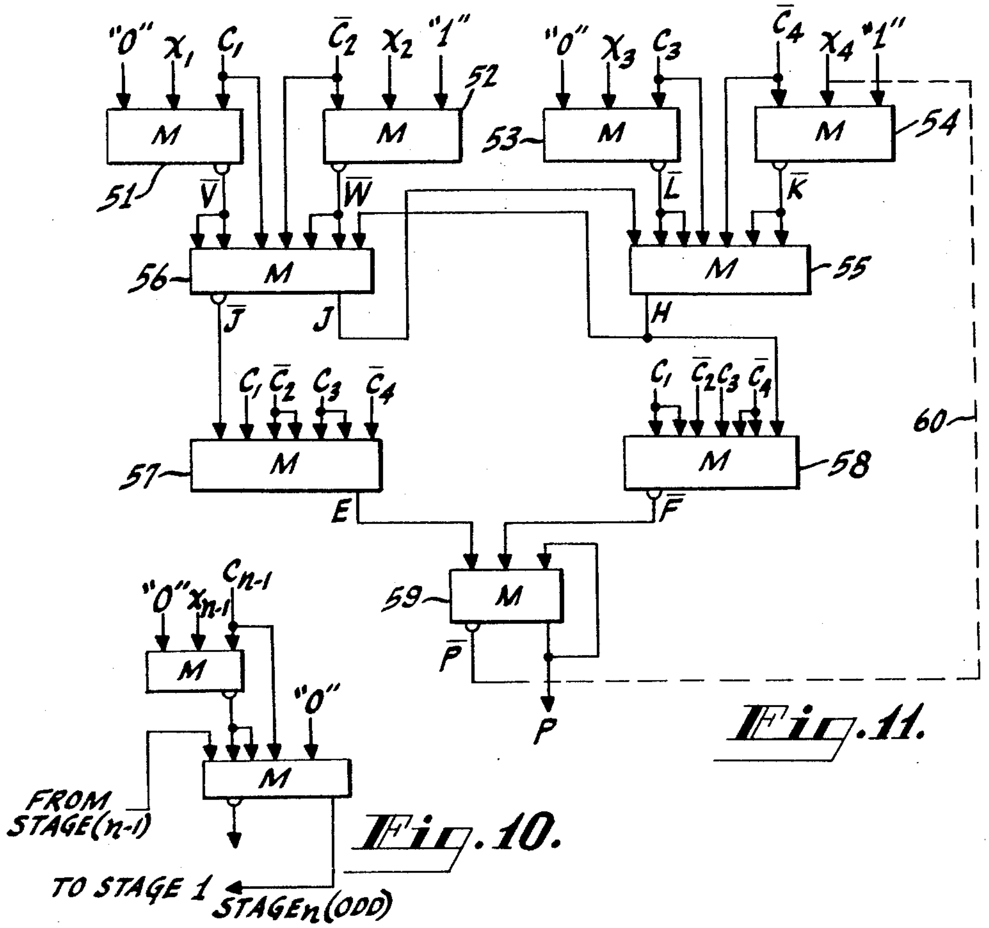
FIGURE 10 shows a portion of the circuit of FIGURE 9 in modified form.
FIGURE 11 is a block diagram of a circuit which during the time it receives new information, produces an output indicative of previously stored information.

The circuit of FIGURE 11 includes nine gates 51–59, respectively. There are four input bits $x_1$–$x_4$ and four control signals $C_1$–$C_4$ applied to gates 51–54, respectively. The circuit accepts a bit $x_i$ when $C_i=1$ and all other C's are 0. When $C_i$ is changed back to 0, then $x_i$ is stored. To write in another bit $x_j$ while simultaneously reading $x_i$, $C_j$ is made equal to 1. When $C_j$ is removed, $x_j$ will be stored.

The circuit of FIGURE 11 may be employed as one cell of a shift register. The information bits may come from the following sources: $x_1$=output of cell to the left; $x_2$=output of cell to the right; $x_3$=new data bit; $x_4$=the complemented output $\overline{\mathrm{P}}$ of gate 59 fed back as an input (this is shown schematically in FIGURE 11 by the dotted line 60). The control voltages indicate the following commands: $C_1=1$ is the shift right command; $C_2=1$ is the shift left command; $C_3=1$ is the load register command; $C_4=1$ is the complement register command.

To give an example of the operation of the circuit of FIGURE 11, assume that $C_1=1$ and $C_2=C_3=C_4=0$. Now, $\overline{V}=\bar{x}_1$; $\bar{J}=V=x_1$; at gate 57, $\overline{C}_2$ cancels $C_3$, $C_1=1$, $\overline{C}_4=1$ so that $E=1$ regardless of the value of $\bar{J}$; at gate 55, $H=J=\bar{x}_1$; at gate 58 $C_1=1$ and $\overline{C}_4=1$ so that $\overline{F}=0$ regardless of the value of H. Of the three inputs to gate 59, $E=1$ and $\overline{F}=0$ so that gate 59 continues to store the previous bit P.

Now $C_1$ is changed back to 0 and $C_2$, $C_3$ and $C_4$ are also 0. Gate 56 continues to store the previous bit as does gate 55. In the previous analysis it was shown that $\bar{J}=x_1$ and $H=\bar{x}_1$. In gates 57 and 58 all the control voltages cancel so that $E=\bar{J}=x_1$ and $\overline{F}=\overline{H}=x_1$. Therefore, gate 59 receives as inputs $x_1$, $x_1$ and P and it produces as an output and stores $P=x_1$.

Figure 12:
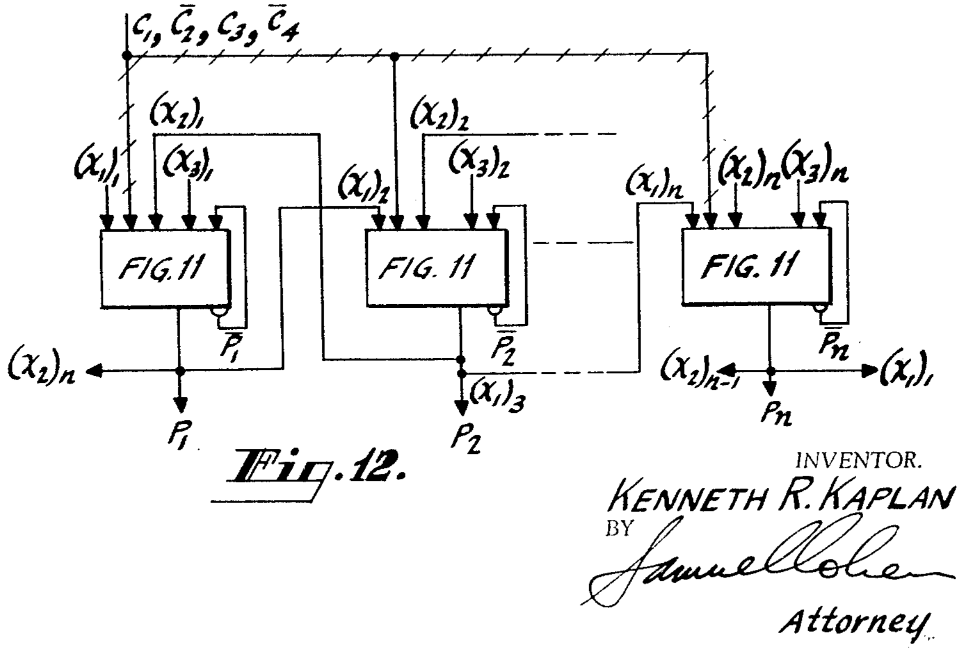
FIGURE 12 is a block diagram of a register made up of a plurality of circuits such as shown in FIGURE 11.

FIGURE 12 shows a register made up of circuits of FIGURE 11. The control voltage bus is shown as a single wire crossed by short slanted lines.

What is claimed is:

1. A logic circuit comprising, in combination:

a first threshold gate;

means for applying to the gate an information signal, a bias signal and a control signal, with respective weights such that when the control signal represents the same binary value as the bias signal said gate produces an output signal having a predetermined value which is unaffected by the value of the information signal, and when the control signal and bias signal represent different binary values, the gate produces an output signal having a value which is a function of the value of said information signal; and a second threshold gate receptive of said control signal, the output signal of said first gate and other signals with respective weights such that when said control signal represents the same binary value as said bias signal, the effect of the output signal of said first gate on said second gate is cancelled and one of the other input signals to said second gate controls the output of said second gate, and when said control signal and bias signals represent different binary values, said second gate produces an output which is a function of the value of the output signal produced by said first gate.

2. A logic circuit as set forth in claim 1, wherein said first threshold gate produces an output signal indicative of the minority function of said control, bias and information signals and wherein said output signal is applied to said second gate with weight $n$, where $n$ is an integer greater than 1.

3. A logic circuit as set forth in claim 1, wherein said first threshold gate produces an output signal having a value which is indicative of the value of the minority of said control, bias and information signals; wherein said second gate has a threshold of 3; and wherein said output is applied to said second gate with weight 2, said control signal is applied to said second gate with weight 1, said bias signal is applied to said second gate with weight 1, and a fourth signal is applied to said second gate with weight 1.

4. In the circuit set forth in claim 1:

said first gate having a threshold of 2 and the three input signals to said first gate each having a weight of 1;

said second gate having a threshold of $n+1/2$ and the inputs to said second gate have a total weight of $n$, where $n$ is an odd integer; and said second gate receiving as inputs the output signal of said first gate with weight 2, the bias and control signals applied to the first gate, each with weight 1, and at least one additional input signal with weight 1.

5. The circuit of claim 4, wherein $n=5$ and the additional input signal to the second gate comprises an output signal indicative of the majority function, produced by said second gate.

6. Two circuits as set forth in claim 5, wherein the bias signal applied to the first and second gates of one circuit is complementary to the bias signal applied to the first and second gates of the other circuit, and wherein the information signal received by the first gate of one circuit is an output signal indicative of the minority function, produced by the second gate of the other circuit.

7. Two circuits as set forth in claim 5, wherein the bias signal applied to the fisrt and second gates of one circuit is complementary to the bias signal applied to the first and second gates of the other circuit, and wherein the information signal received by the first gate of each circuit is, in one case, an output signal indicative of the minority function, produced by the second gate of the other circuit, and in the other case, an output signal indicative of the majority function, produced by the other circuit.

8. A logic circuit comprising, in combination:

a first three input threshold gate, each input having the weight 1, and said gate producing an output indicative of the minority function of said three inputs;

means for applying to the gate an information signal, a bias signal and a control signal;

a second threshold gate having a threshold of 3; and means for applying to said second gate the output signal of said first gate with weight 2, said control signal with weight 1, a third signal with weight 1 which has the same value as the bias signal, and a fourth signal with weight 1.

9. A logic circuit comprising, in combination:

a first three input threshold gate, each input having the weight 1, and said gate producing an output indicative of the minority function of said three inputs;

means for applying to the gate an information signal, a bias signal and a control signal;

a second threshold gate having a threshold of $n+1/2$, where $n$ is an odd integer; and means for applying to said second gate said output signal of said first gate with weight 2, said control signal with weight 1, and other signals with total weight $n-3$, where for one set of values of signals applied to said first and second gates the effect on the second gate of said output signal of said first gate is cancelled, and for another set of values of signals applied to said first and second gates, the output signal produced by said second gate is a function of the output signal produced by said first gate.

10. A logic circuit comprising, in combination:

a first three input threshold gate, each input having the weight 1, and said gate producing an output indicative of the minority function of said three inputs;

means for applying to the gate an information signal, a bias signal and a control signal;

a second three input threshold gate, each input having the weight 1, and said gate producing an output indicative of the minority function of its three inputs;

means for applying to said second gate an information signal, a bias signal having a value complementary to that of the bias signal applied to the first gate, and a control signal;

a third threshold gate having a threshold of 4; and means for applying to said third gate said output signal of said first gate with weight 2, said two control signals, each with weight 1, said output signal of said second gate with weight 2, and a fifth signal with weight 1.

11. The circuit set forth in claim 10, wherein the fifth input to said third gate comprises an output signal indicative of the majority function, produced by said third gate.

12. Two circuits as set forth in claim 10, wherein the fifth input to the third gate of one circuit comprises an output signal indicative of the majority function, produced by the third gate of the other circuit.

13. Two circuits as set forth in claim 10, wherein the fifth input to the third gate of each circuit comprises an output signal indicative of the majority function, produced by the third gate of the other circuit.

14. A logic circuit as set forth in claim 13, further including:

seventh and eighth threshold gates, each with a threshold of 4 and a ninth threshold gate with a threshold of 2;

means for applying to the seventh gate, the minority output of the third gate of the first circuit with weight 1, the control signal applied to the first gate of the first circuit with weight 1, the control signal applied to the second gate of the first circuit with weight 2, the control signal applied to the first gate of the second circuit with weight 2, and the control signal applied to the second gate of the second circuit with weight 1;

means for applying to the eighth gate the majority output of the third gate of the second circuit with weight 1, the control signal applied to the first gate of the first circuit with weight 2, the control signal applied to the second gate of the first circuit with weight 1, the control signal applied to the first gate of the second circuit with weight 1, and the control signal applied to the second gate of the second circuit with weight 2; and means for applying to the ninth gate the majority output signal of the seventh gate with weight 1, the minority output of the eighth gate with weight 1 and a third signal with weight 1.

15. A logic circuit as set forth in claim 14, wherein the information signal applied to one of said first and second gates comprises an output signal of said ninth gate indicative of the minority function.

16. A logic circuit as set forth in claim 14, wherein the third signal applied to said ninth gate comprises a signal indicative of the majority function produced by said ninth gate.

17. A logic circuit as set forth in claim 9, wherein said second threshold gate is a majority/minority gate which has a threshold of 4, and further including:

third and fourth gates, each a majority/minority gate, and each with a threshold of 3;

means for applying to the third gate, the majority output signal of the third gate with weight 1, the majority output signal of the second gate with weight 1, the minority output signal of the fourth gate with weight 1 and two additional signals, each with weight 1;

means for applying to the fourth gate the majority output signal of the fourth gate with weight 1, the minority output signal of the third gate with weight 1, the minority output signal of the second gate with weight 1, and two other signals, each with weight 1; and said other signals with total weight $n-3$ applied to said second gate comprising, a bias signal of the same value as the bias signal applied to the first gate and having a weight 1, the majority output signal of said fourth gate with weight 1, the minority output signal of said third gate with weight 1, and the majority output signal of said second gate with weight 1.

References Cited

UNITED STATES PATENTS 3,275,812 9/1966 Coates ---------- 307—211 X

DONALD D. FORRER, Primary Examiner

U.S. Cl. X.R.

328—92

PO-1050
(5/69)

UNITED STATES PATENT OFFICE
CERTIFICATE OF CORRECTION

Patent No. 3,456,126 Dated July 15, 1969

Inventor(s) Kenneth P. Kaplan

It is certified that error appears in the above-identified patent and that said Letters Patent are hereby corrected as shown below:

| | | |
|---|---|---|
| Column 4 | Table I | under Gate 18, "P" should be --$\bar{P}$-- |
| Column 4 | line 70 | change "P=x" to --$\bar{P}$=x-- |
| Column 5 | line 17 | change "Q" to --$\bar{Q}$-- |
| Column 5 | line 62 | change "Q" to --$\bar{Q}$-- |

SIGNED AND SEALED

NOV 4 1969

(SEAL)
Attest:

Edward M. Fletcher, Jr.
Attesting Officer

WILLIAM E. SCHUYLER, JR.
Commissioner of Patents